United States Patent
Luski et al.

(10) Patent No.: US 9,952,485 B1
(45) Date of Patent: Apr. 24, 2018

(54) VIDEO SURVEILLANCE CAMERA HAVING A SEPARABLE AND REMOVABLE GIMBAL

(71) Applicant: Innotech Security, Inc., Pompano Beach, FL (US)

(72) Inventors: Moshe Luski, Cooper City, FL (US); Devin Benjamin, Pompano Beach, FL (US)

(73) Assignee: INNOTECH SECURITY, INC., Pompano Beach, FL (US)

( * ) Notice: Subject to any disclaimer, the term of this patent is extended or adjusted under 35 U.S.C. 154(b) by 0 days.

(21) Appl. No.: 15/179,609

(22) Filed: Jun. 10, 2016

Related U.S. Application Data

(60) Provisional application No. 62/173,881, filed on Jun. 10, 2015.

(51) Int. Cl.
| | | |
|---|---|---|
| H04N 5/225 | (2006.01) |
| G03B 17/56 | (2006.01) |
| F16M 11/12 | (2006.01) |
| F16M 11/18 | (2006.01) |
| F16M 13/02 | (2006.01) |
| F16M 11/04 | (2006.01) |

(52) U.S. Cl.
CPC ......... *G03B 17/561* (2013.01); *F16M 11/041* (2013.01); *F16M 11/126* (2013.01); *F16M 11/18* (2013.01); *F16M 13/02* (2013.01); *H04N 5/2252* (2013.01)

(58) Field of Classification Search
CPC .... G03B 17/561; F16M 11/041; F16M 13/02; F16M 11/126; F16M 11/18; H04N 5/2252
See application file for complete search history.

(56) References Cited

U.S. PATENT DOCUMENTS

| | | | |
|---|---|---|---|
| 7,534,057 B2 | 5/2009 | Jones et al. | |
| 8,882,369 B1* | 11/2014 | Nelson | H04N 5/2252 396/427 |
| 2003/0103161 A1* | 6/2003 | Tatewaki | G08B 13/19619 348/375 |
| 2005/0248653 A1* | 11/2005 | Hoang | H04N 7/108 348/143 |
| 2010/0073483 A1* | 3/2010 | Squillante | H04N 7/181 348/159 |

\* cited by examiner

*Primary Examiner* — Padma Haliyur
(74) *Attorney, Agent, or Firm* — DLA Piper LLP US

(57) ABSTRACT

A video surveillance camera system having an easily removable and separable video camera housing comprised of a dome base, a rotational base, gimbal, and a spherically shaped transparent dome cover is disclosed. The dome base includes a surface mounting plate and a grommet. The rotational base has an outer rim being removably attachable to the dome base and rotatable about a first axis parallel to the dome base. The rotational base further includes a gimbal bracket attached to the outer rim and tiltable about a second axis perpendicular to the dome base; the gimbal bracket further includes a gimbal mount which is constructed and arranged to receive a gimbal. The separable and removable gimbal provides an electrically connected circuit board and zoom lens, wherein the circuit board includes an outlet for a CAT5 connection cable and a BNC connection cable and a switch to allow independent operation of either connection.

13 Claims, 10 Drawing Sheets

VIDEO SURVEILLANCE CAMERA HAVING A SEPARABLE AND REMOVABLE GIMBAL

PRIORITY CLAIM

In accordance with 37 C.F.R. 1.76, a claim of priority is included in an Application Data Sheet filed concurrently herewith. Accordingly, the present invention claims priority under 35 U.S.C. §§ 119(e), 120, 121, and/or 365(c) to U.S. Provisional Patent Application No. 62/173,881, entitled "VIDEO SURVEILLANCE CAMERA HAVING A SEPARABLE AND REMOVABLE GIMBAL", filed Jun. 10, 2015. The contents of the above referenced application are incorporated herein by reference in its entirety.

FIELD OF THE INVENTION

The present invention relates generally to video surveillance systems, and more particularly, to an easily removable gimbal for a video surveillance camera.

BACKGROUND OF THE INVENTION

Surveillance camera systems are widely used for safety, security and information gathering. For example, surveillance camera systems may be installed in and around a very wide variety of residential or commercial buildings, medical facilities, parking structures, larger sports facilities, casinos and the like, to provide personal safety, security of the grounds and/or to gather information related to potentially hazardous or illegal activity. The cameras are normally used to generate a video image of an area under surveillance for use by security personnel, either for "live" action viewing, or for later review of recorded data. In some cases, cameras are mounted to a wall or to a ceiling structure where they may be observed by people within the area under surveillance. In other cases, the cameras are hidden from view by being placed behind one-way mirror domes to avoid creating an objectionable presence to an honest person or make it difficult, to impossible, for potential wrongdoers to locate and see where the cameras are being directed.

Since surveillance cameras were first introduced, camera users have sought to mount their cameras in various locations and positions. The key to effective use of a security camera is to ensure that it is directed at the area to be observed. Prior art security cameras were typically mounted within a static bracket fixed in a single position. In other later cases, the camera mount became adjustable, but on only one axis. Because of the manner in which the camera modules in prior art security cameras have most often been mounted, there are severe limitations in the degree to which they may be tilted, which limits the potential range of coverage a security camera may have. Prior art devices suffer from the inability to adjust about two axes. Therefore, the cameras must be remounted or mounted in a different location should the area to be surveyed change or the line of sight becomes obscured. The present invention seeks to alleviate the aforementioned issues by providing a camera gimbal. A camera gimbal, or pivotal support, is generally smaller and lighter than typical camera mounts. Furthermore, and perhaps more importantly, the camera gimbal is adjustable in at least two axes and also rotationally adjustable about the axis of the camera.

With the advent of a camera gimbal that allows for adjustment of the camera about more than one axis, the next step is to determine the proper location to place, i.e. mount, the video surveillance camera. The idea of drilling holes through the walls of a home or office to run video and power cables for a security camera system could seem difficult and daunting. In order to find the right location to install a surveillance camera for a home or office, several factors are considered in order to provide the most advantageous location for installation. A good location is where the roof meets the walls of the housing or office structure because it shelters the camera from the elements, such as wind, rain, snow and sun. Additionally, placing the cameras near the roof provides a good viewing area with minimal risk of vandalism. Another advantage is, when running cables (power & video), the task becomes easier as many homes or office structures have a small gap or hole between the roof and the wall where cables can be routed.

When selecting the cable for video, RCA, BNC coaxial cable, or Category 5 twisted pair cables can be used. BNC cables generally have lower losses than RCA, are more rugged, and are most commonly constructed using coaxial cable, such as the one which runs in your home to connect with the cable company. This type of cable is referred to as RG-59. The BNC connectors are usually molded onto the cable end. BNC cable is used for analog cameras or one of the many HD-over analog technologies, such as TVI, CVI or HD-SDI. BNC cable is typically used by lower quality non-digital solutions. Although RG-59 cable is effective, it is relatively heavy, may be awkward to install, and requires special tools. With the advent of video baluns (a small lipstick size device) you can now run video and power over a Category 5 cable. The Category 5 cable, also known as Cat5, carries four pairs of wires which allows for more runs on a single cable, is much lighter and thus easier to work with. While distances beyond 500 feet become a video signal problem for BNC, Cat5 can comfortably extend out to 1,000 feet. Therefore, Cat5 is far preferable to BNC. Internet Protocol (IP) cameras typically use Cat5 cable, and can shoot in HD up to 5MP (2.5×1080P), thus whenever possible it is preferable to run a system with Cat5. However, for surveillance camera cabling, it is usually seen as advantageous to use the industry standard, which is typically the BNC cable. However, with increased use of HD, it would be more advantageous to have the flexibility to convert from a BNC to a Cat5 cable. The present invention seeks to alleviate this problem by providing a circuit board that allows for the connection of either a BNC or Cat5 cable on the same circuit board.

The next step in installing video surveillance is to find a point of entrance from the outside to the inside of the structure. Most structures have an attic or crawl space which is a convenient place to run cable lines through. Within the attic, one can designate a specific location for the DVR and monitor to be stationed and bring all the cable lines to that designated room from the attic. As for the power, two choices are available: one can run each power line separately into an outlet (using pig tails) and an AC Adapter, or one can get a power supply box, plug all power lines into the power supply, and from the power supply only one power line is needed into the outlet. Lastly, once the video and power lines are connected, all that remains is to power the DVR and attach a Monitor thereto.

Surveillance camera systems of the types just described have had numerous problems and limitations associated with their use. Maintenance of cameras in domes or other enclosures is difficult and time consuming as the camera mount mechanism commonly used is firmly secured within the dome containing the associated control electronics. Replacing circuit boards or cables becomes very difficult as the entire dome structure must be removed from the structure or the base, and then the camera mount mechanism must be removed from the dome base in order to make the necessary maintenance changes. Typically, the removal from either the structure or the dome base requires removal of screws and then physical removal of the camera mount which may result in damage to the camera mount before attempting to make the necessary maintenance changes.

Prior art surveillance camera systems have been complex electromechanical structures with the following disadvantages: these structures have been expensive, difficult to install, and difficult to maintain. When servicing was required, it would usually require removal of the entire structure, which was not always an easy, time-effective procedure.

U.S. Pat. No. 7,534,057 discloses a surveillance camera gimbal mechanism which utilizes a rotationally adjustable disk and support arrangement to afford smoothly adjustable, fastener-free, and stable diagonal adjustment that also provides axial compliance. The diagonal adjustment mechanism is integrated with a pan and tilt gimbal mechanism to allow smooth and stable single-point manual fixation of pan and tilt positions without creating depressions in the mating parts which make readjustment difficult.

The present invention overcomes the disadvantages of the prior art by providing a cost-effective surveillance camera system which is easy to install, adaptive to various connection cables, and easy to maintain by providing a gimbal that is separable from the base.

SUMMARY OF THE INVENTION

The present invention is a video surveillance camera system having an easily removable and separable video camera housing comprised of a dome base, a rotational base, a gimbal, and a dome cover. The dome base has an open top, an outer peripheral edge, and a closed bottom with a grommet to allow cables therethrough, and a surface mounting plate thereon. The rotational base has an outer rim removably attachable to the dome base and rotatable about a first axis parallel to the dome base. Further, the rotational base includes a gimbal bracket attached to the outer rim and tiltable about a second axis perpendicular to the dome base. The gimbal bracket also includes a gimbal mount which is constructed and arranged to receive a gimbal. The separable and removable gimbal provides an electrically connected circuit board and zoom lens, wherein the circuit board includes an outlet for a CAT5 connection cable or a BNC connection cable and a switch to allow independent operation of either the CAT5 or BNC connection. The spherically shaped transparent bubble cover is attached to the dome base to enclose the rotational base and gimbal within the dome base and dome cover.

Accordingly, it is an objective of the instant invention to enable a video surveillance camera system to have an easily removable and separable gimbal for easy maintenance and circuit board or lens repair.

It is a further objective of the instant invention to provide a video surveillance camera system whereby the dome base remains affixed to a surface and the gimbal and rotational base are removable and separable therefrom.

It is yet another objective of the instant invention to provide a video surveillance camera system that avoids the risk of damaging the circuit board during maintenance because the gimbal, which includes the circuit board and lens, is removable and separable.

It is a still further objective of the instant invention to provide a video surveillance camera installation that allows for either BNC or CAT5 connection thereto.

It is another further objective of the instant invention to provide a video surveillance camera installation where the dome base and dome cover can be constructed of various materials.

It is still yet further an objective of the instant invention to provide a video surveillance camera installation that allows for easy removal or maintenance of the gimbal.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
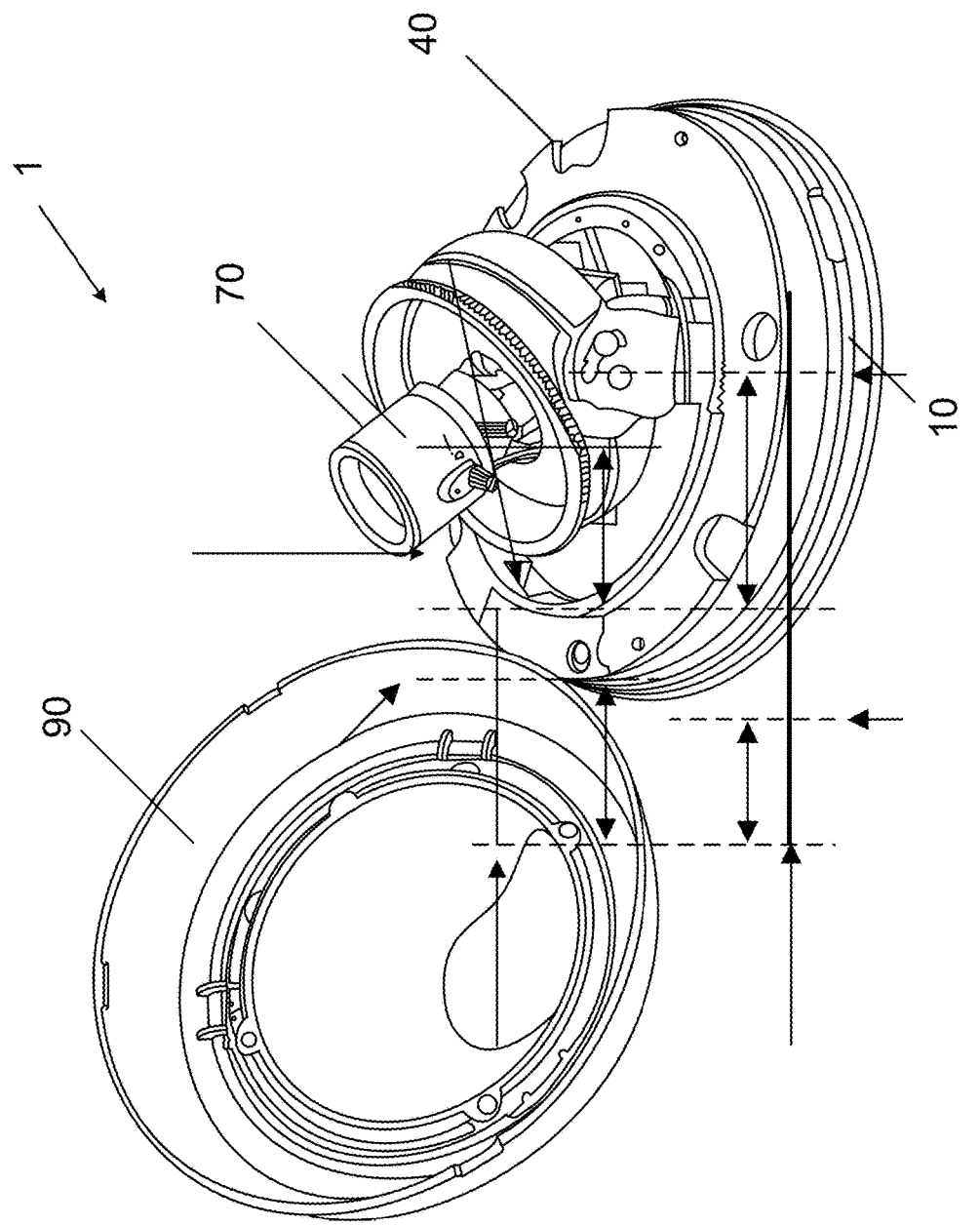
FIG. 1 is a perspective view of the instant invention in a disassembled state.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
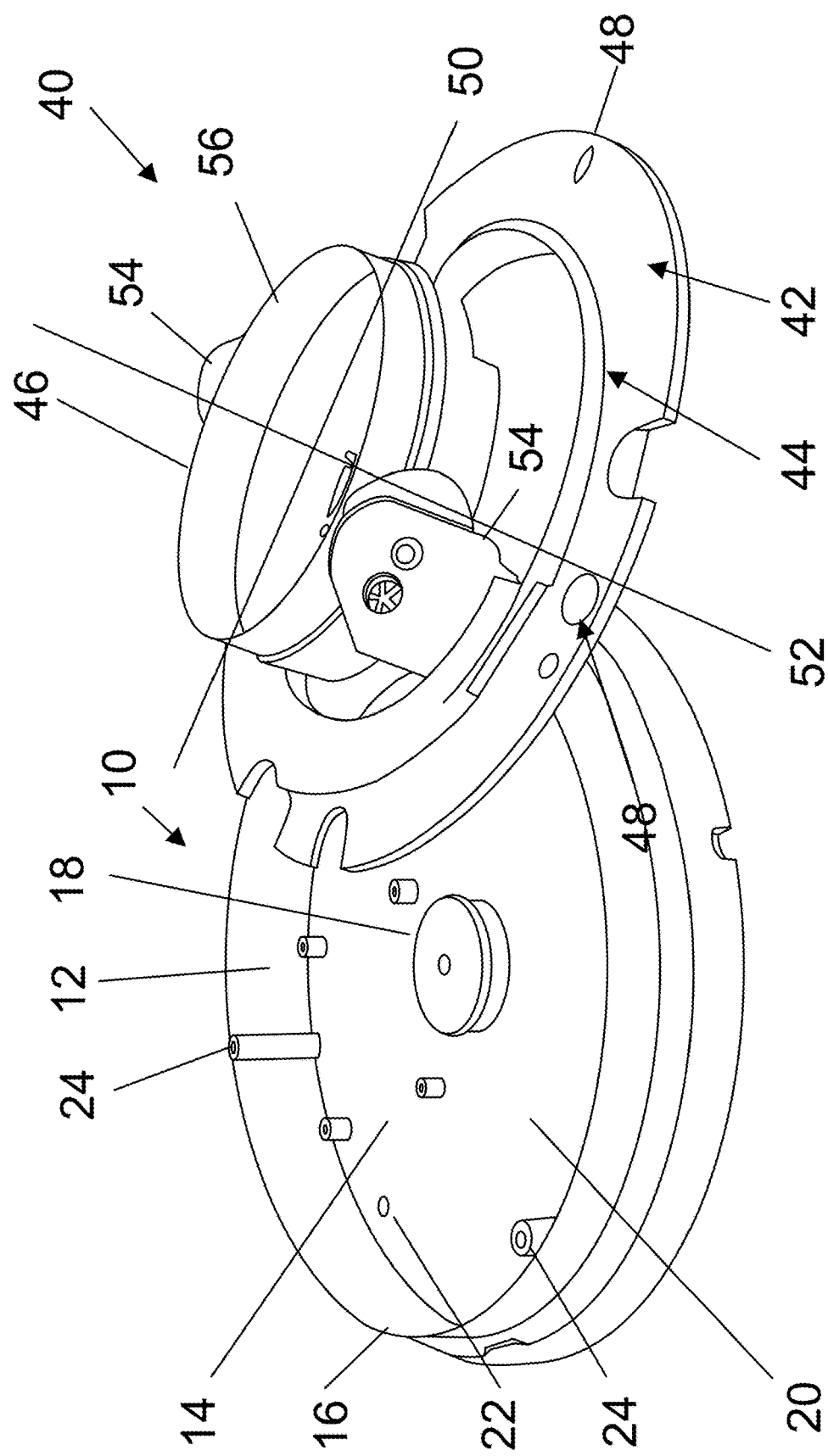
FIG. 2 is a perspective view of the dome base and rotational base of the instant invention.
Figure 3:
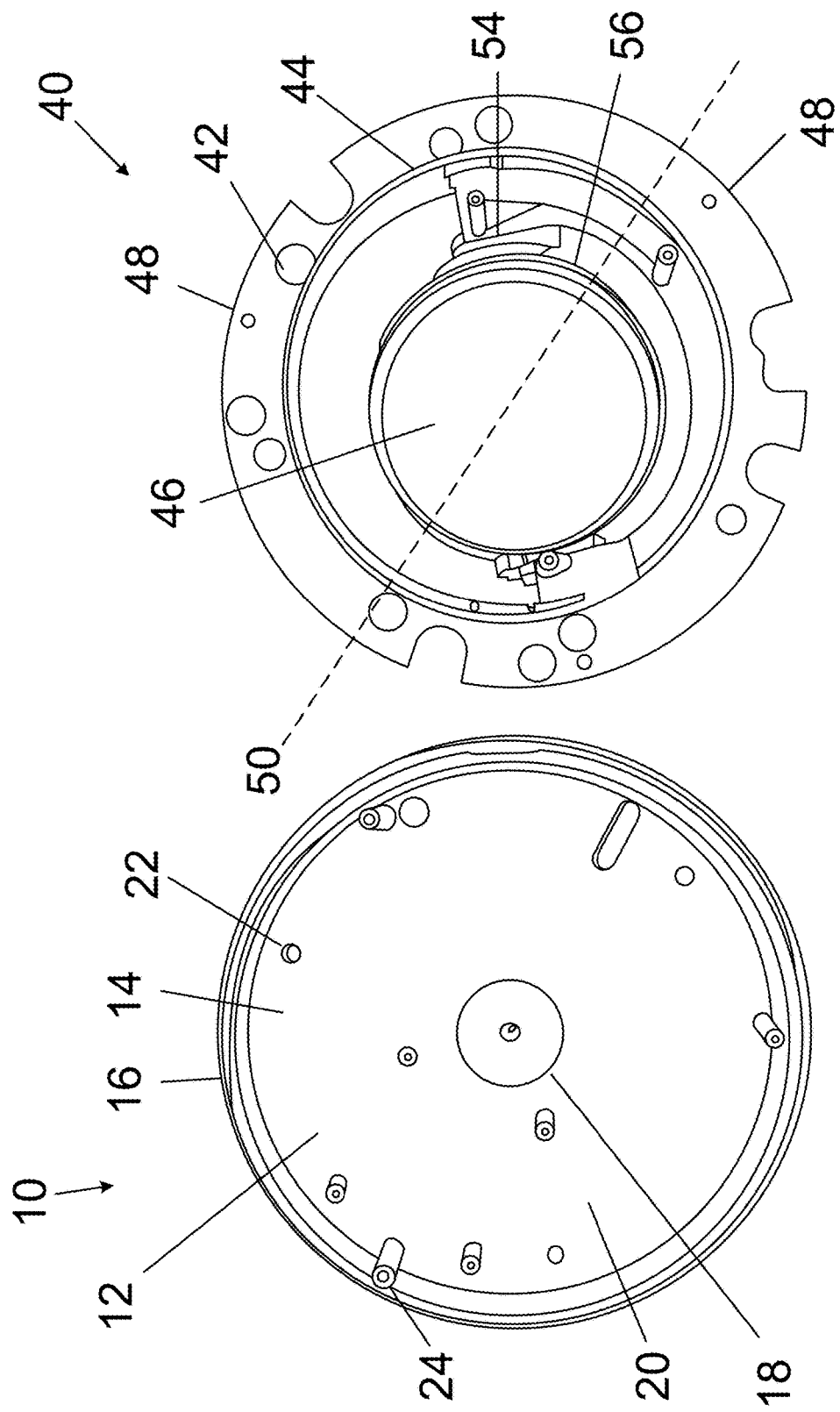
FIG. 3 is a top view of the dome base and rotational base of the instant invention.

As shown in FIG. 1, a video surveillance camera 1 having an easily removable gimbal 70 is described herein. The video surveillance camera 1 is comprised of a dome base 10, a rotational base 40, gimbal 70, and dome cover 90. As shown in FIGS. 2 and 3, the dome base 10 has an open top 12, closed bottom 14, and an outer peripheral edge 16. The closed bottom 14 on the base 10 contains a grommet 18 to allow cables therethrough. The grommet 18 is preferably located at the center of the closed bottom 14 of the dome base 10. Also included on the closed bottom 14 is a surface mounting plate 20. The surface mounting plate 20 is preferably comprised of a plurality of apertures 22 constructed and arranged to accept screws for mounting the dome base 10 to a surface. In order to install the video surveillance camera 1, four holes are drilled using the dome base apertures 22 as a template against surface.

As shown in FIGS. 2 and 3, the outer peripheral edge 16 of the dome base 10 includes a plurality of screw openings 24. Each screw opening 24 is sized to accept a screw to attach the rotational base 40 to the dome base 10. Although the dome base 10 is attached to the rotational base 40 using screws, it is contemplated that other fastener means to attach such include a snap-lock, rivets, snap fasteners, pins, latches, or the like. The rotational base 40 includes an outer rim 42, a gimbal bracket 44, and gimbal mount 46. The outer rim 42 is removeably attachable to the outer peripheral edge 16 on the dome base 10 using corresponding screw openings 48 that attach the rotational base 40 to the dome base 10. The outer rim 42 is also rotatable about a first axis 50 parallel to the dome base 10. The gimbal bracket 44 is attached to the outer rim 42 and tiltable about a second axis 52 perpendicular to the dome base 10. The gimbal bracket 44 is constructed and arranged to hold and maintain the gimbal 70 within the gimbal mount 46. The gimbal bracket 44 is comprised of a pair of posts 54 that extend outward from the outer rim 42. The pair of posts 54 are attached to the gimbal mount 46, which is defined as a circular ring 56 sized for entry of the gimbal 70. The attachment of the gimbal 70 to the circular ring 56 includes, but is not limited to snap-locks, rivets, snap fastener, pins, latches, or the like. Not shown, a motor is provided to rotate the outer rim and gimbal bracket about their corresponding axes. The gimbal is separable from the dome base and rotational base allowing for easy removal or maintenance of the circuit board or lens attached to the gimbal.

Figure 4:
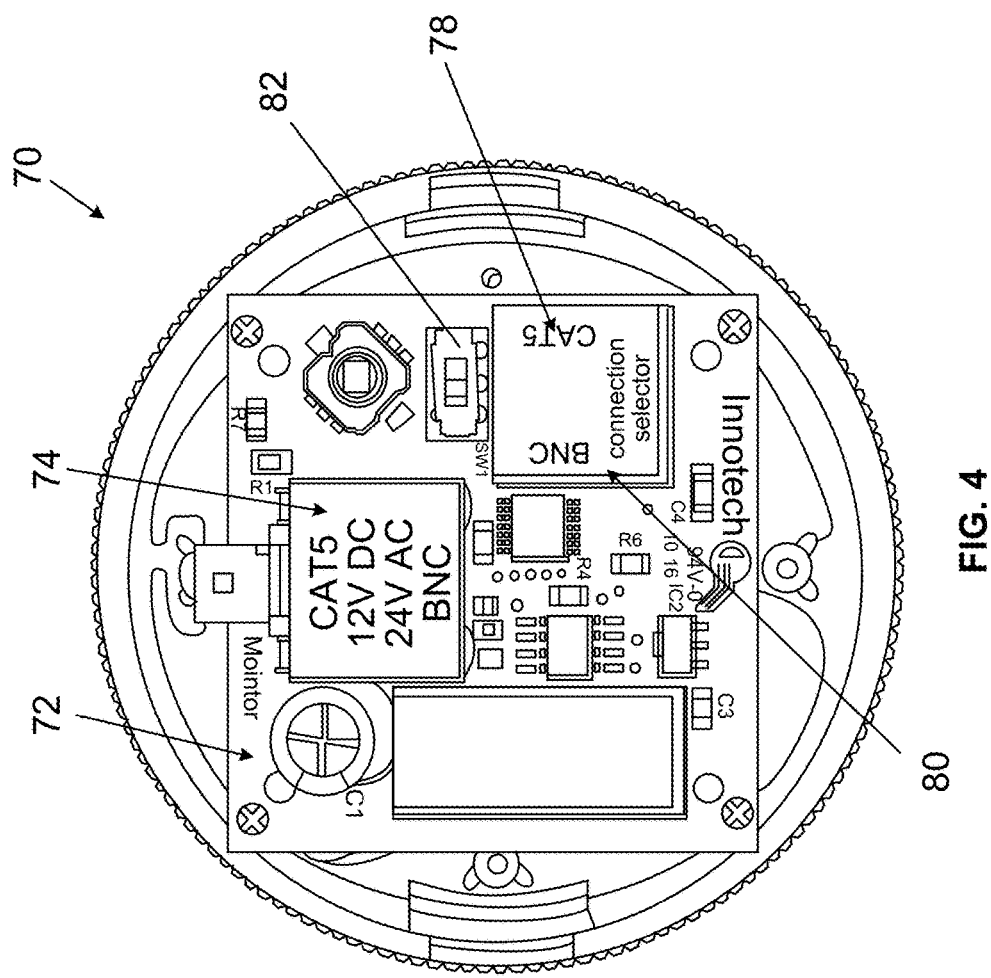
FIG. 4 is a back view of the gimbal of the instant invention.
Figure 5:
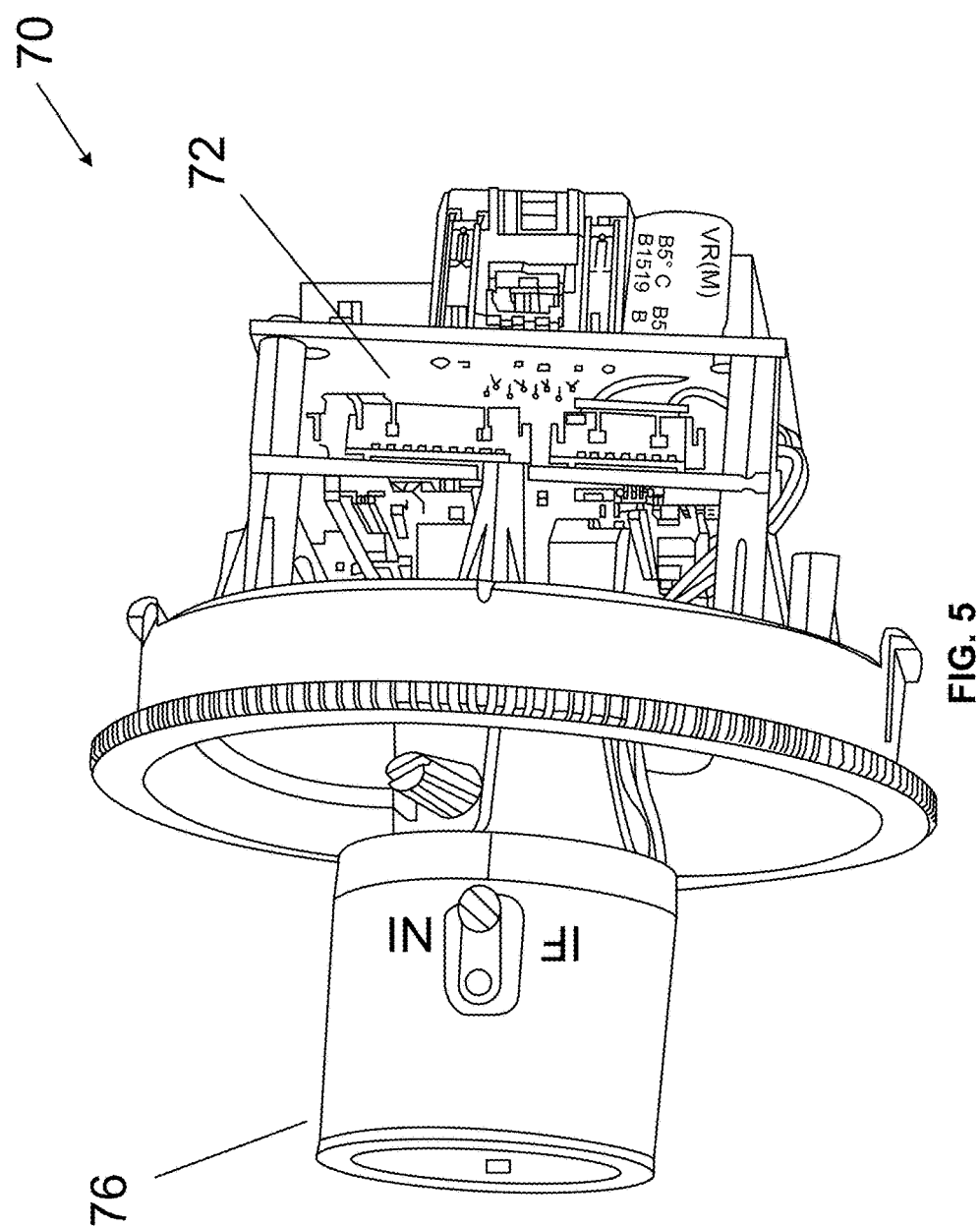
FIG. 5 is a perspective side view of the gimbal of the instant invention.

The gimbal 70 is sized to be received within the gimbal mount 46. As shown in FIGS. 4 and 5, the gimbal 70 has an electrically connected circuit board 72, power outlet 74, and zoom lens 76. The circuit board 72 includes an outlet for a CAT5 connection cable 78 and an outlet for a BNC connection cable 80. The outlets are configured with corresponding pins to match with the BNC or CAT5 connection cable, not shown. The outlets for the CAT5 and BNC connection, 78 and 80, are controlled by a switch 82 on the circuit board 72 that allows for independent operation of either the CAT5 connection 78 or BNC connection 80. When using a CAT5 connection 78, the switch 82 is set to CAT5, and when using a BNC connection 80, the switch 82 is set to BNC.

FIGS. 7-10 depicts the circuit board employed by the present invention to allow it to operate between both CAT5 and BNC connections. As seen, the circuit board incorporates an integrated video balun component 84 which is used to send the video signal over UTP (CAT5) cable. A side switch 86 on the circuit board is used to select the video connection type, either 75-ohm standard coaxial cable (BNC) or UTP (CAT5) connection. Setting the switch to BNC bypasses the video balun component 84 and the corresponding portion of circuitry as shown in the diagram.

Figure 6:
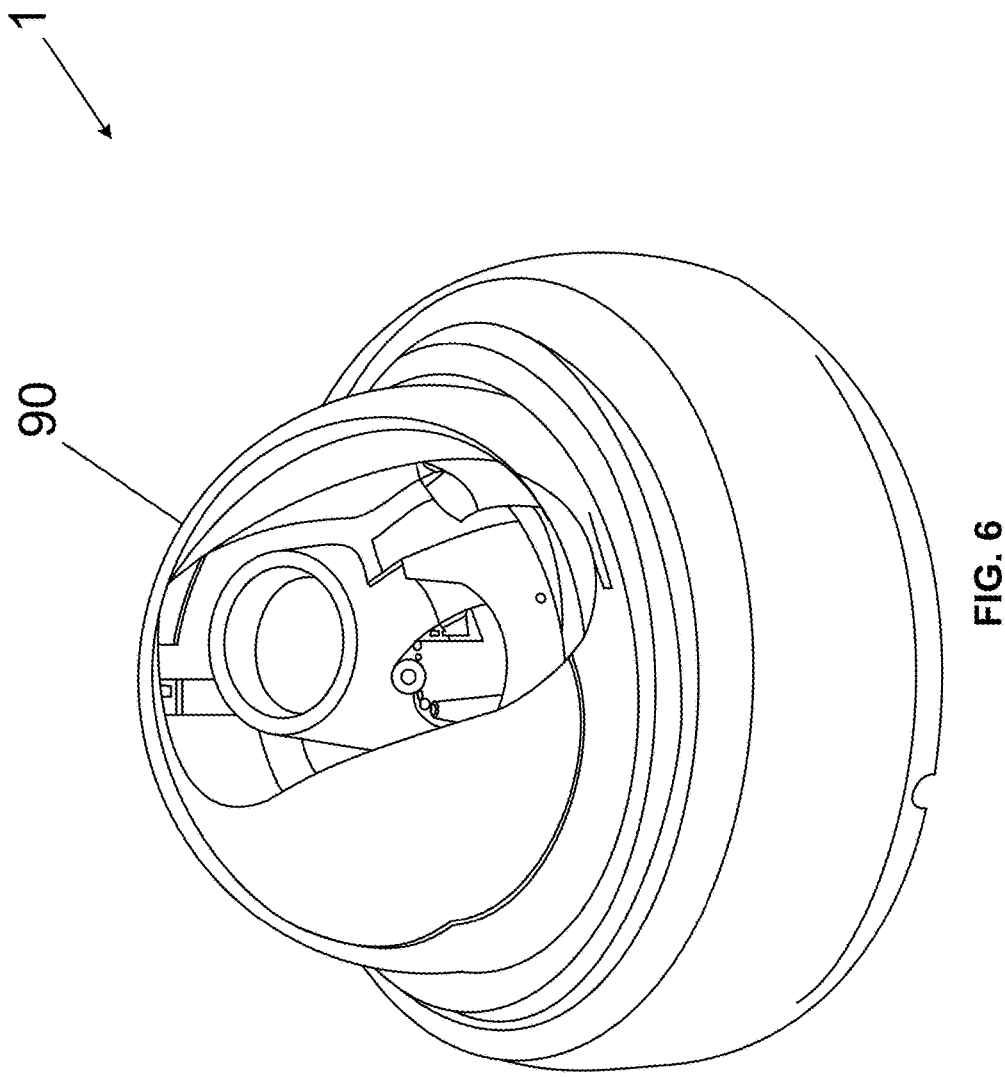
FIG. 6 is a perspective view of the instant invention in an assembled state.
Figure 7:
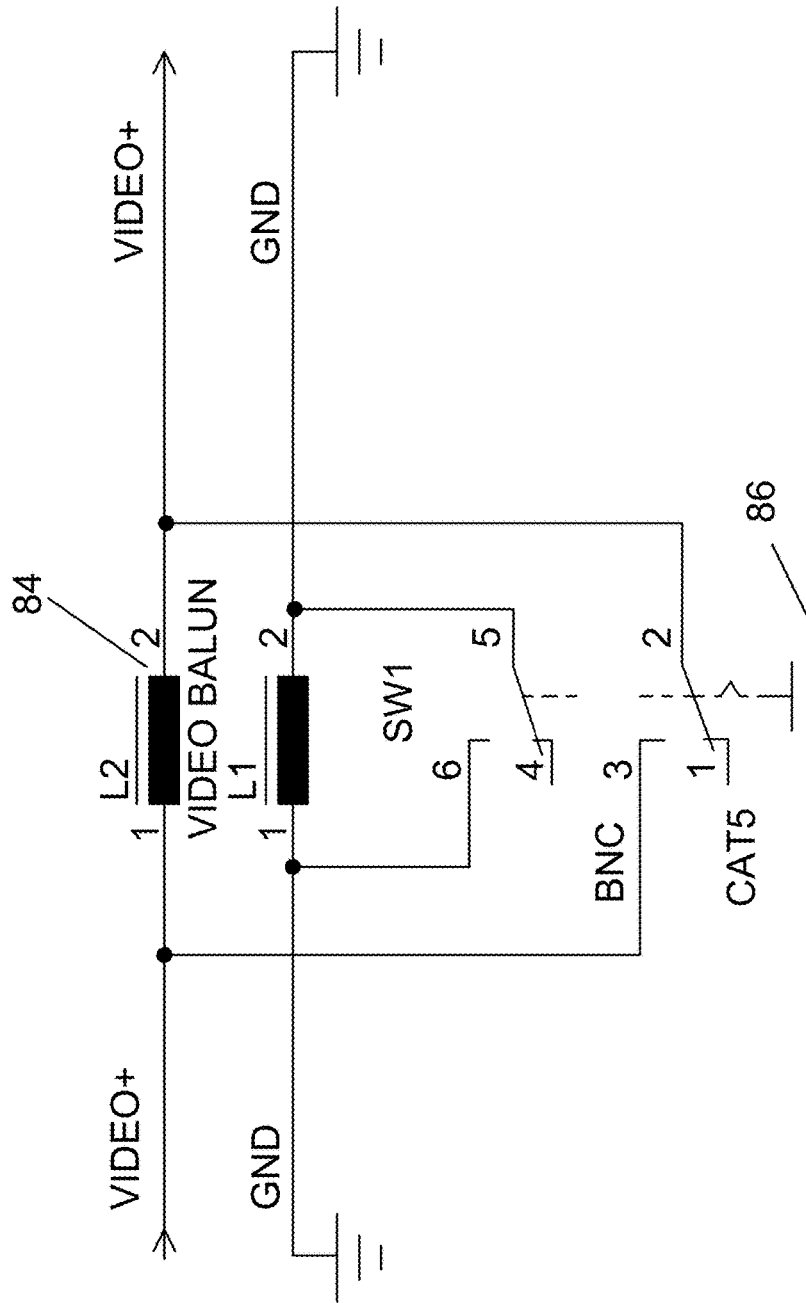
FIG. 7 is a schematic representation of the circuit board employed by the instant invention.
Figure 8:
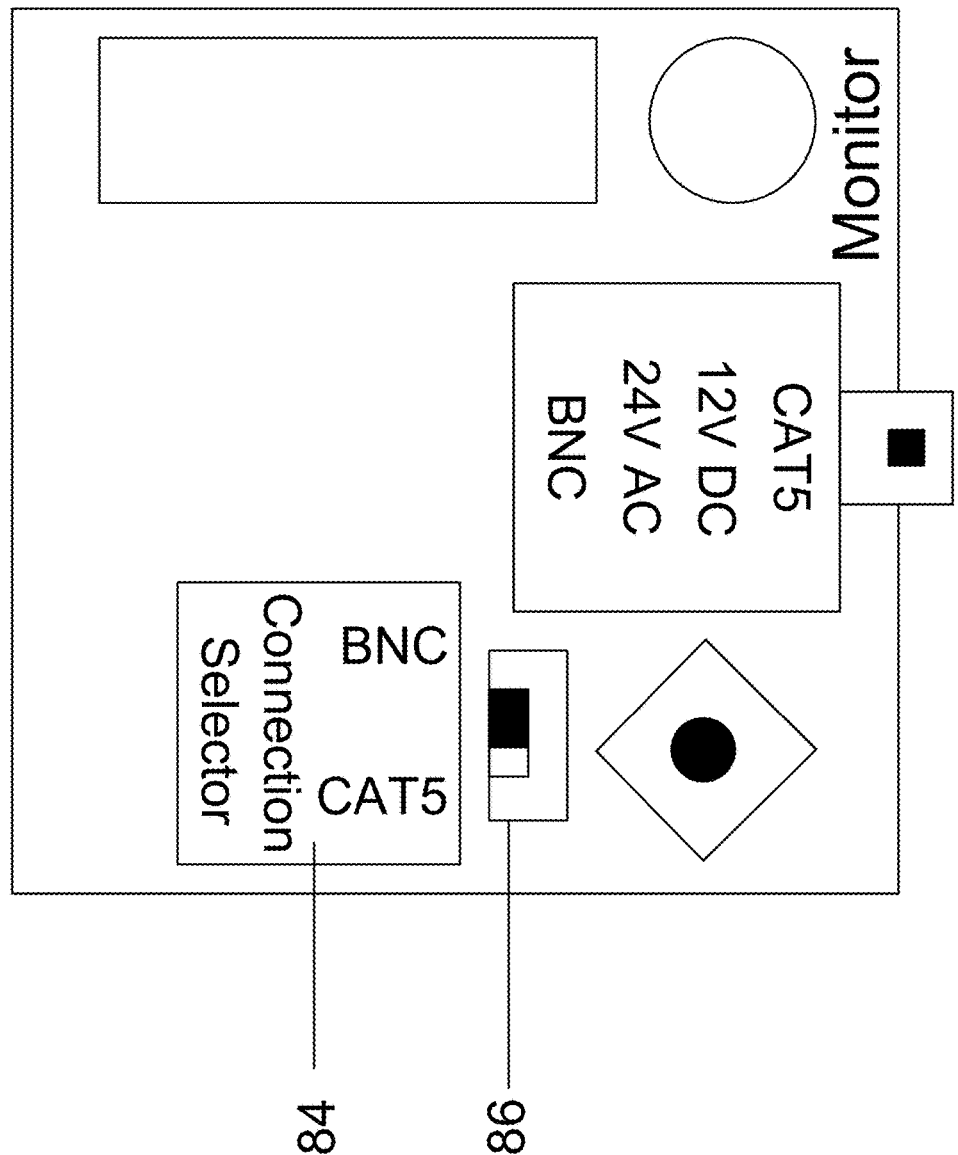
FIG. 8 is a diagram of the circuit board.
Figure 9:
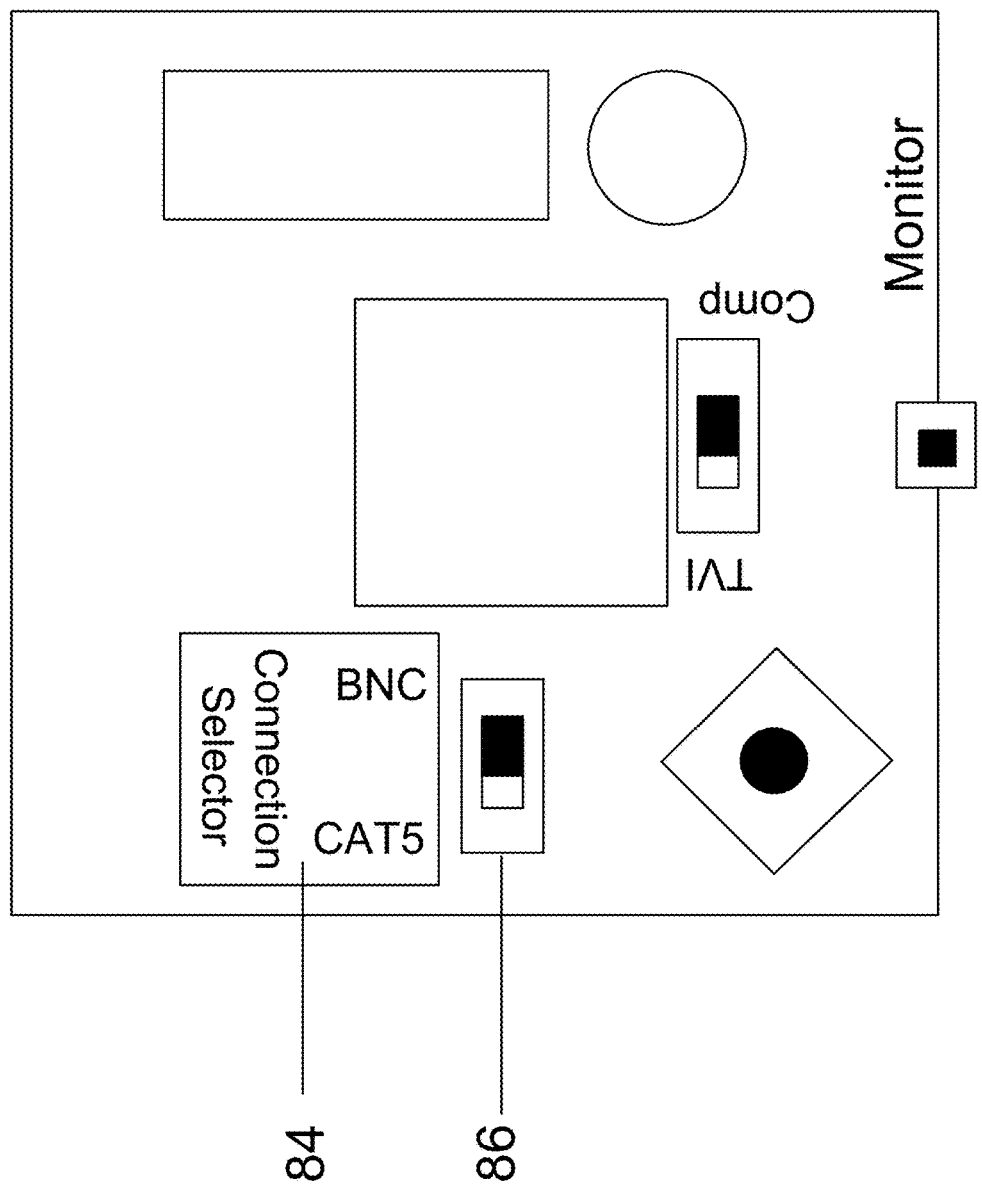
FIG. 9 is an alternate diagram of the circuit board.
Figure 10:
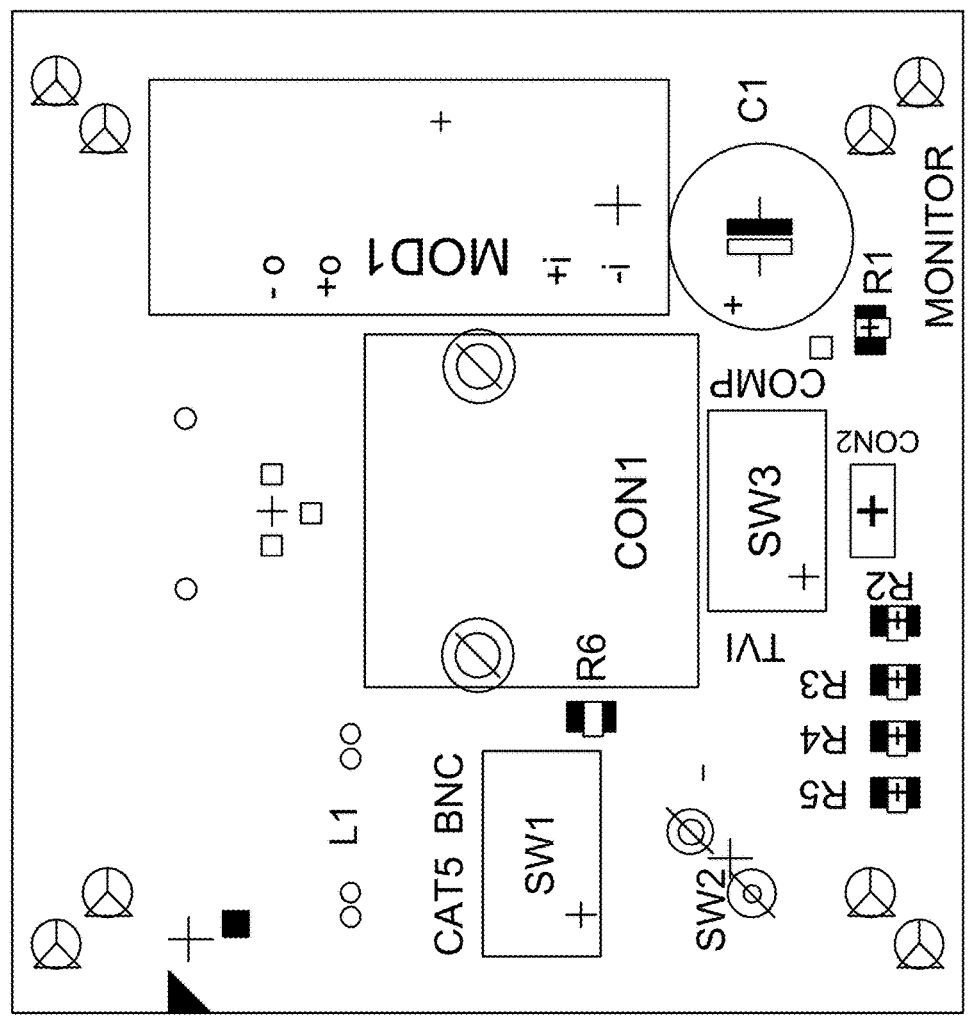
FIG. 10 is a detailed diagram of the circuit board showing connections.

Once the dome base 10 is installed on a surface, the rotational base 40 is then attached thereto. Next, the BNC or Cat5 cable, as well as the power cable, which runs through surface is run through the grommet 18 on the dome base 10 and then through the circular ring 56 on the gimbal mount 46. The BNC or Cat5 cable is then connected to the receiving CAT5 and or BNC connection outlet, 78 or 80, on the gimbal circuit board 72 and the switch 82 is set to the particular connection setting. Power is then supplied to the power outlet 74, and the gimbal 70 is placed within the gimbal mount 46. Lastly, the dome cover 90 is a spherically shaped transparent cover piece that attaches to the dome base 10 and encloses the rotational base 40 and gimbal 70 within, as shown in FIG. 6.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A video surveillance camera system comprising:
    a dome base, said dome base having an open top, an outer peripheral edge, and a closed bottom, said dome base closed bottom including a grommet and a surface mounting plate constructed and arranged to enable attachment of the dome base to a surface;
    a rotational base, said rotational base having an outer rim, said outer rim removably attached to said dome base, said outer rim constructed and arranged to be rotatable about a first axis;
    a gimbal bracket attached to said outer rim of said rotational base, said gimbal bracket constructed and arranged to be tiltable about a second axis, said gimbal bracket including a gimbal mount;
    a gimbal removably attached to said gimbal mount, said gimbal mount constructed and arranged to receive said gimbal, said gimbal including an electronically connected circuit board with a cable outlet and a zoom lens; and
    a dome cover, said dome cover attached to said dome base and enclosing said rotational base.

2. The video surveillance camera system of claim 1, wherein said cable outlet includes an outlet for a CAT5 connection cable and an outlet for a BNC cable.

3. The video surveillance camera system of claim 2, wherein the circuit board includes a switch to allow for independent operation of either the CAT5 or BNC connection.

4. The video surveillance camera system of claim 1, wherein said rotational base is constructed and arranged to be fixed in a static position after positioning relative to rotation about said first axis and tiling about said second axis.

5. The video surveillance camera system of claim 1, wherein the rotational base is configured to be mechanically rotated about said first axis.

6. The video surveillance camera system of claim 5, wherein said gimbal bracket is configured to be mechanically tiltable about said second axis.

7. The video surveillance camera system of claim 1, wherein said surface mounting plate includes a plurality of apertures constructed and arranged for mounting said dome base to a surface.

8. The video surveillance camera system of claim 1, wherein the gimbal bracket comprises a pair of posts extending outward from the rotational base outer rim, said posts attached to a gimbal mount, said gimbal mount constructed and arranged to accept and maintain said gimbal.

9. The video surveillance camera system of claim 1, wherein said circuit board includes a video balun component for sending a video signal over a UTP (CAT5) cable.

10. The video surveillance camera system of claim 9, wherein said circuit board includes a switch to direct the circuit signal through said video balun component for use of a UTP (CAT5) cable, or bypassing said video balun component for using of a 75-ohm standard coaxial (BNC) cable.

11. The video surveillance camera system of claim 1, wherein said first axis is substantially parallel to said dome base.

12. The video surveillance camera system of claim 1, wherein said second axis is substantially perpendicular to said dome base.

13. The video surveillance camera system of claim 1, wherein said dome cover is substantially hemispherical.

\* \* \* \* \*